United States Patent
Bennett et al.

(10) Patent No.: US 6,603,487 B1
(45) Date of Patent: Aug. 5, 2003

(54) SYSTEM FOR ELECTRONICALLY DEVELOPING AND PROCESSING A DOCUMENT

(75) Inventors: William Edward Bennett, Tucson, AZ (US); Stephen Joy Boies, Mahopac, NY (US); Lauretta Jones, Purdys, NY (US); Stephen Eric Levy, Saskatoon (CA); Douglas Charles Lovell, Wappingers Falls, NY (US); Neil Lustig, New York, NY (US); Paul Michael Matchen, Pleasantville, NY (US); Richard Dean Thompson, Lake Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/741,459

(22) Filed: Oct. 31, 1996

(51) Int. Cl.[7] .................................................. G09G 5/00
(52) U.S. Cl. ..................................................... 345/751
(58) Field of Search .......................... 705/38; 395/238; 345/751

(56) References Cited

U.S. PATENT DOCUMENTS

| | | | | |
|---|---|---|---|---|
| 5,008,853 A | * | 4/1991 | Bly et al. ..................... 345/331 |
| 5,220,657 A | * | 6/1993 | Bly et al. ..................... 711/152 |
| 5,231,571 A | | 7/1993 | D'Agostino | |
| 5,247,615 A | * | 9/1993 | Mori et al. .................. 709/205 |
| 5,253,165 A | | 10/1993 | Leiseca et al. | |
| 5,301,270 A | * | 4/1994 | Steinberg et al. ........... 345/326 |
| 5,515,491 A | * | 5/1996 | Bates et al. ................. 345/331 |
| 5,611,052 A | * | 3/1997 | Dykstra et al. ............. 395/238 |
| 5,671,428 A | * | 9/1997 | Muranaga et al. .......... 345/751 |
| 5,699,527 A | * | 12/1997 | Davidson .................... 395/238 |
| 5,713,019 A | * | 1/1998 | Keaton ........................ 707/10 |
| 5,732,219 A | * | 3/1998 | Blumer et al. ......... 395/200.57 |
| 5,819,274 A | * | 10/1998 | Jackson, Jr. ................. 707/10 |
| 5,857,189 A | * | 1/1999 | Riddle ......................... 707/10 |
| 5,870,721 A | * | 2/1999 | Norris ......................... 705/38 |
| 5,874,960 A | * | 2/1999 | Mairs et al. ................. 345/340 |
| 5,878,403 A | * | 3/1999 | DeFrancesco et al. ........ 705/38 |

FOREIGN PATENT DOCUMENTS

DE          2257200      * 11/1972

OTHER PUBLICATIONS

Word Perfect, Version 5.1, Word Perfect Corporation, 1989, pp. 130.*

Database Inspec Institute of Electrical Engineers, Stevenage, GB Insp No. 5,174,224, "Case study I: how NASA's Goddard Space Fight Center decided security can support EDI on the Internet", XP002053567 & I/S Analyzer, Dec. 1995, United Communications Group, USA, vol. 34, No. 12, ISSN 0896–3231, pp. 2–6.

Database Inspec Institute of Electrical Engineers, Stevenage, GB Inspec No. 5,030,605, Tanaka, M., et al.: "On Time, providing timely procurement Information through the Internet", XP002053568 & NTT Review, Jul. 1995, Japan, vol. 7, No. 4, ISSN 0915–2334, pp. 8–11.

Database Inspec Institute of Electrical Engineers, Stevenage, GB Inspec No. 4,271,929, Skelly, M.E.: "Speeding the workflow through imaging (leasing company)", XP 002053569 & Modern Office Technology, Sep. 1992, USA, vol. 37, No. 9, ISSN 0026–8208, pp. 34 and 36.

* cited by examiner

Primary Examiner—James W. Myhre
(74) Attorney, Agent, or Firm—Stephen C. Kaufman, Esq.; McGinn & Gibb, PLLC (57) ABSTRACT

In an exemplary embodiment, a customer, an automobile dealership, a participating financial institution, and a credit bureau may be electronically connected in a system that preferably uses the internet in order to develop and process a legal document comprising a credit application. The system thereby eliminates a paper-based process of credit approval, providing an efficient interaction between businesses and their customer.

48 Claims, 11 Drawing Sheets

Primary applicant information

| Type Joint | First name | MI | Last name | Suffix | Birthday - -19 | ??? NO |
|---|---|---|---|---|---|---|
| Soc. Sec. Numb. - - | Home phone ( ) - | | Own/rent | | | CREDIT DECISION |

Current Address

| Years | Months | City | | State | ZIP code | |
|---|---|---|---|---|---|---|
| Number | ONLY the street name | | Apt | Previous address ? | Pull bureau ? | CO-APPLICANT |

Finacial information

| Employer name | | | Years | Months | | |
|---|---|---|---|---|---|---|
| Other income ? | Total other income ? $0 | Position/title - | | | Employer address ? | LOAN INFORMATION |
| Bank name | | Account type | | | | |

Vehicle

| Status New | Year 96 | Make | Model | | Program Retail | Term | Other | CONTRACT |
|---|---|---|---|---|---|---|---|---|
| MSRP | Cash price | | Cash down | | Extras allowance | | | |
| Dealer allowance | Owed on trade | | Net trade in $0.00 | | Total requested $0.00 | | | PRINT APPLICATION |

SAVE AND EXIT    DISCARD CHANGES    ENTER THE INFORMATION. HIT TAB TO MOVE TO NEXT FIELD. INFORMATION

SYSTEM FOR ELECTRONICALLY DEVELOPING AND PROCESSING A DOCUMENT

BACKGROUND OF THE INVENTION

This invention relates to a novel system for electronically developing and processing a legal document.

INTRODUCTION OF THE INVENTION

Motivation for the present invention may be referenced to the following illustrative problem, which centers on retail automobile financial transactions.

A typical present day retail automobile financial transaction, for example, a loan or lease contract, may require the participation of a customer, a car dealership, one or more financial institutions (banks), and one or more information (credit) bureaus. These organizations develop a contract from a preliminary input draft stage to its final executable stage, in a process that takes from 4–10 days and which may require utilization of paper forms, faxes, and/or mail delivery. In sum, we believe this to be an unwieldy process: it is disadvantageously slow, inefficient, and can lead to frustrating dead-ends.

SUMMARY OF THE INVENTION

Our work addresses and ameliorates this situation, by eliminating the noted deficiencies of present day contract procurement processes. To this end, we disclose a system for electronically developing and processing a legal document. In a first aspect, the system comprises:

1) at least one local computer workstation, wherein at least one such local workstation can electronically capture information input by a first party for developing the legal document;
2) at least one remote information bureau computer workstation, wherein at least one such information workstation is connectable to the local workstation for electronically further developing the legal document; and
3) at least one remote financial institution comprising a second party to the legal document and having a computer capability connectable to the local workstation for electronically further developing the legal document for contemplated execution of the legal document by said first and second parties.

In a second aspect, the system comprises:

1) at least one local computer workstation, wherein at least one such local workstation can electronically capture information input by a first party for developing the legal document; and
2) at least one remote financial institution comprising a second party to the legal document and having a computer connectable to the local workstation for electronically further developing the legal document for contemplated execution of the legal document by said first and second parties.

The invention as defined can realize significant advantages, including inter alia:

1) reducing a contract procurement process from 4–10 days to under one hour;
2) eliminating the use of paper forms, faxes, and overnight mail delivery;
3) reducing inefficiencies and attendant costs;
4) providing reusable information;
5) providing encrypted information, for secure transmission; and
6) providing valid test information as it is entered, thereby screening errors and mistakes and ensuring accuracy of transmitted information.

BRIEF DESCRIPTION OF THE DRAWINGS

The invention is illustrated in the accompanying drawing, in which.

DETAILED DESCRIPTION OF THE INVENTION

Figure 1:
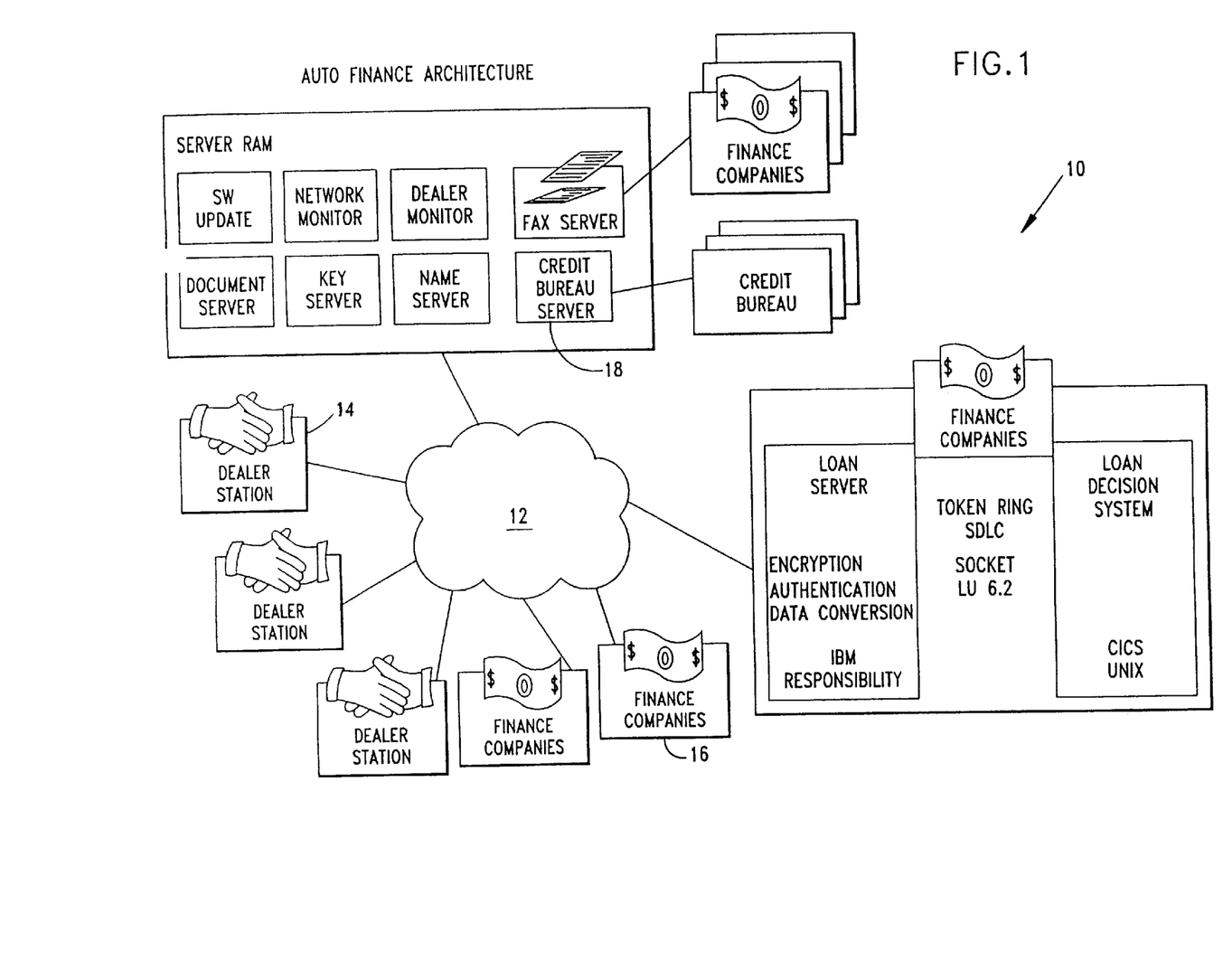
FIG. 1 shows a preferred system architecture for realization of the present invention.

Attention is first directed to FIG. 1, which shows an architecture of a preferred system 10 of the present invention. In overview, the system 10 shows an internet hub 12, with radial electronic links to 1) a plurality of computer workstations 14 located at sundry automobile dealer stations; 2) a plurality of computer workstations 16 located at sundry financial companies; and, 3) a plurality of computer workstations 18 located at sundry credit information bureaus.

In operation, the FIG. 1 system 10 facilitates the following illustrative service wherein a car dealership, a customer, a selected financial institution, and a selected credit information bureau, may individually or severally cooperate to electronically develop and process a legal document e.g., a credit application for contemplated ultimate execution.

A preferred operation mode comprises the following steps:

1) A dealer and/or customer may apply for credit, using a keyboard or preferably a touch-screen interface (disclosed in detail below) to enter a credit application.
2) Once the credit application is completed, the dealer and/or customer may select from a list of participating financial institution (bank) for transmission of the credit application.
3) The credit application preferably is encrypted and preferably transmitted over the internet, preferably to a server which can decrypt the application and feed it into the bank's loan processing system.
4) A credit decision may be transmitted back to the dealer, preferably over the internet, in just a few minutes (rather than hours/days it typically takes today).
5) Once the customer has agreed to the financing, a completed contract may be filled out in the system and electronically transmitted to this bank. This step preferably includes capturing a digital image of the customer's written signature for transmission to the financial institution.

In realization of this operation mode, a dealership workstation preferably comprises a flexible variety of configurations, ranging from a single workstation to multiple workstations.

A single workstation configuration typically is used by a manager, and preferably comprises:

A Pentium based PC keyboard, and mouse.

A 17" touch screen high resolution monitor with signature pen.

A laser printer equipped to print legal sized, duplex documents.

A 28.8 modem.

An Internet access ID

Complete software environment.

Ongoing hardware and software support.

Help desk with 'how to support', and problem assistance.

In a typical multiple workstation configuration, an average dealership has a single primary workstation, probably used by the financial manager, and multiple sales workstations, one for each salesperson on the floor, with perhaps a workstation on a pedestal or stand located on the showroom floor for customer use. The primary workstation in a multi-station dealership is preferably configured to include:

A Pentium based PC, keyboard, and mouse.

A 17" touch screen high resolution monitor with signature pen.

A laser printer equipped to print legal sized, duplex documents.

A 28.8 modem.

A LAN card and software.

An Internet access ID.

Complete software environment.

Ongoing hardware and software support.

Help desk with 'how to support', and problem assistance.

The sales workstation is preferably configured as follows:

A Pentium base PC, keyboard, and mouse.

A 17" touch screen high resolution monitor with signature pen.

LAN card and software.

Complete software environment.

Ongoing hardware and software support.

Help desk with 'how to' support and problem assistance.

Large dealerships may have multiple financial workstations and multiple sales workstations.

User Interface

To facilitate the various styles of use anticipated for the system 10, the invention discloses two interaction styles. The user can select either the guided mode or the power mode, and can switch back and forth between styles at any point in the process. The interface also allows the user to interact with the customer using any combination of mouse, keyboard, touch-screen, tablet, trackball or other such devices and/or signature pen. All interface devices are allowed to be active simultaneously, allowing the user to develop the most comfortable interaction style.

Guided Mode

To facilitate the use of the system by consumers and dealership staff who are not familiar with computers, an easy to use guided mode is available. In this mode, the user is prompted for each item of information individually. The dealer workstation(s) 14 include means for recognizing a qualitative extent of further developing the document and transmitting it to the information (e.g, credit) bureau computer(s) or the financial company(ies) (e.g,., the remote entity) based on the qualitative extent. For example, as the information requirements change based on the information being solicited, the system displays a different interaction device such as a telephone keypad, a keyboard, or calendar on the screen. Through the use of graphics and the touch screen the guided mode enables the system to be used by the most inexperienced of users.

Power Mode

To facilitate the use of the system by experienced users, such as dealership staff familiar with the system, a fast path power mode is available. In this mode the user can enter all of the information required off of a few main screens, quickly and easily. Rather than being guided step by step, the system allows the user to provide the required information by tabbing from field to field. While this is less intuitive than the guided mode, it allows an experienced user to complete an application in as little as two minutes.

Aided Interaction

At several points in the process of completing a credit application, the user interface preferably provides aided interaction techniques; the system can make use of data bases to assist the user in completing the form. For example, a database of first names (sorted by frequency of occurrence in the population) helps the user enter his or her first name. By entering one or two keystrokes, a user can usually see his or her name on the dynamic pick list and simply touch the name to finish providing that information. Another example is during address entry, where the system uses an address database (such as USPS) to provide the user with appropriate City/State once a zip code is entered. It can even help select valid street names using the same database. The above are further examples of the workstation(s) 14 including means for recognizing a qualitative extent of further developing the document and transmitting it to the information (e.g., credit) bureau computer(s) or the financial company (ies) (e.g., the remote entity) based on the qualitative extent.

The goal of these aided interaction techniques is to assist the user by speeding data entry and helping avoid errors in data entry.

Intelligent Applications

The system 10 preferably embodies an intelligent application form. As opposed to a conventional paper based credit application form, the electronic form may be dynamically modified to fit the characteristics and needs of the consumer, and financial institution, and the specifics of the transactions. This is a further example of the above-mentioned means for recognizing a qualitative extent of further developing the document and transmitting it to the information (e.g., credit) bureau computer(s) or the financial company(ies) (e.g., the remote entity) based on the qualitative extent. For example, the system can shorten the application where particular information is not used in the current transaction. A good example of this is the requirement for a previous address. If a consumer has lived at their current address for a specified (parameter driven) period of time, the system will not ask for a previous address.

Just as we seek to shorten the application process for some consumers, we also ensure that all required information is captured, and that an application is not submitted unless it is complete. Completeness criteria will also vary by transaction. As in the above example, previous address might be required, as might previous employer, job title, or other information frequently left off applications. The goal of the intelligent application is to ensure that the system captures correct, complete information as quickly as possible, in a process that is easy for the consumer and dealership professional.

Credit Bureaus

As a part of the normal business process in the dealership for many financing transactions, the dealership obtains a credit report on the consumer. To facilitate this, the system is electronically connected to allow the dealer to obtain a credit report through our system. The dealer can then either read the report on-line, or print the report on an attached laser printer. The report is billed and recorded as if the dealer had obtained the report in a traditional manner.

Credit Response

After the electronic application is transmitted to financial institutions the dealer receives constant status as to the application. Preferably at each stage, an icon displays the current status of the application in the approval process, including, for example,:

| Paper airplane | In transit over the Internet |
| --- | --- |
| Paper airplane in mailbox | Received by the financial institutions |
| Paper airplane in in-box | Under review by financial institution Auto-Scoring system |
| Green Check | Approved |
| Magnifying glass | Under review by financial institution credit analyst |
| Red arrow | Declined |
| Yellow question mark | Counter-offer by financial institution |

Electronic Contract Processing

After receiving an approval or counter offer from a financial institution, the dealer can electronically build the contract, in the same method used to build the original credit application. All information from the original credit application is automatically carried over to the contract. Also automatically included in the contract is all information received from the financial institution during the approval process (net financed amount, rate, residual value, etc . . . ) The contract can then be completed, printed (for the consumer and/or dealership records) and transmitted to the approving financial institution. The electronic transmission is automatically entered into the financial institution's contract booking system, eliminating the need for overnight mail, and allowing the bank to fund the deal immediately.

By building the contract from existing data, combined with data received from the financial institution, we ensure that the contract, when received by the financial institution, is correct. This is another example of the workstation's means for recognizing a qualitative extent of further developing the document and transmitting it to the information (e.g., credit) bureau computer(s) or the financial company (ies) (e.g., the remote entity) based on the qualitative extent. This is in contrast to today's process where high error rates on contracts often delay the funding of retail deals to some extent, and lease deals in particular where error rates on contracts can run as high as 45%. By building the contract, and not allowing the dealer to modify fields relevant to the approved economics of the transaction (residual value, buy rate, etc . . . ) we dramatically reduce errors and simplify the process, both for the dealer and financial institution.

Forms Printing

The system is geared towards facilitating the creation of complete and accurate credit applications and contracts, so that they can be transmitted electronically and quickly processed by participating financial institutions. Of course, the consumer still requires a printed copy. The system, preferably through an attached laser printer, can print multiple copies of the credit application, and the contracts of any participating financial institution. These copies can be printed at any stage in the process, from printing a completely blank form, through printing a completed contract after it has been submitted to the financial institution. All printing may be done on plain paper, eliminating the need for pre-printed forms. A dealership might want to print a paper copy of the contract for the consumer to read prior to transmission, or may just wish to print out copies after the fact for dealership and consumer record keeping purposes.

Dealership Setup

The system installed in the dealership allows the dealer to customize certain aspects of the system to speed up application and contract processing. Such fields as vehicle type can be pre-loaded with the make of car sold by the dealer.

One of the most important dealer setup functions is the Financial Sources menu, which is used to direct completed applications. Here, the dealer specifies which FIs (Financial Institutions) the dealership can select from when submitting a credit application, both in E-mail mode (electronic transmissions) and fax mode (the method traditionally used by dealerships). Other key fields such as bank specific dealer ID numbers may also be entered via the dealer setup function.

Store and Forward

To enhance the reliability of the entire system, preferably each component of the system, including the workstation preferably acts as a store and forward, node. Each transaction is stored within the workstation until transmission over the network is reliably completed. If the network is unavailable, the transaction is stored within the workstation, and automatically completed as soon as the network connection is restored. In this manner, data within the system is never lost and, while transmission may be delayed, it is always completed.

Security

The F&I workstation preferably performs encryption and decryption on each transaction, ensuring the privacy of transactions. Each dealer-financial institution pair has a unique encryption key (preferably using 64 bit private key DES encryption) used to encrypt every communication over the network. Keys are preferably changed at random intervals to provide additional security.

At the Financial Institution

An important component of the system 10 resides at the financial institution: the Credit Server. This server acts as the interface between the dealerships communicating over the Internet, and the financial institution's back end credit scoring and contracting systems. The use of an intermediary system provides considerable value for the FI, including:

Allowing the bank to participate without major changes to their existing systems.

Internet security, at both a system and transaction level. The credit server has several major functions, detailed below:

Interface to Host (Translation)

The Credit Server transfers data from the dealership to and from the financial institution's existing systems for credit scoring and contract booking systems. Data may be reformatted and remapped as required, so that the FI's existing systems require little or no change to interface with the dealer service. This is yet another example of the dealer workstation(s) 14 including means for recognizing a qualitative extent of further developing the document and transmitting it to the information (e.g., credit) bureau computer(s) or the financial company(ies) (e.g., the remote entity) based on the qualititive extent. The credit server can also handle required protocol translations, such as interfacing with the FI's system using LU 6.2, TCP/IP, LU 2, IPX, or other protocols.

Store and Forward

To enhance the reliability of the entire system preferably each component of the system including the credit server preferably acts as a 'store and forward' node. Each transaction is stored within the server until transmission over the network is reliably completed. If the network is unavailable, the transaction is stored within the server, and automatically completed as soon as the network connection is restored. In this manner, data within the system is never lost and, while transmission may be delayed, it is always completed with status notification at each step.

Forms Library

All of the contract, applications, and other misc. forms for the financial institution can be stored on the credit server. The forms are preferably stored encoded in a mark-up language on a document server which may be the same machine as the credit server, though they are logically distinct. From a document server, they are down-loaded on demand to an appropriate workstation. Once downloaded to the dealership workstation, the forms can be printed, either blank, or partially/completely filled in.

The process of downloading the correct, up to date and latest forms is completely automatic and executed in the background, without dealers ever having to explicitly request current forms. To accomplish this, the document server keeps track of the forms, and logs the 'latest' version of each specific form, by version number. When a dealer attempts to print a form, the workstation (in the background and automatically) queries the appropriate document server to determine if the workstation has the correct version of the form to be printed. If it does, printing commences. If not, the correct form is immediately downloaded to the dealership where it is stored and then made available for printing.

Rate/Program Information Storage

Preferably contained within the credit server is information containing the participating financial institution's product information, such as rates, programs, residual values, etc . . . This information, in one embodiment, is preferably stored within the credit server, and is maintained by the financial institution. In another embodiment, the information is stored within the financial institution's computer system and produced at request.

Archival Storage

The credit server can store each transaction conducted over the system between the particular financial institution and its associated dealers. These transactions (both coded data and images) can be stored on DASD, and then (if requested) can be stored on CD-ROM to become a permanent record for the financial institution.

Encryption

The credit server performs encryption and decryption on each transaction, ensuring the privacy of transactions. Each dealer-financial institution pair has a unique encryption key (preferably using 64 bit private key DES encryption) used to encrypt every communication over the network. Keys are preferably changed at random intervals to provide additional security.

Printing

The credit server can, on demand, or automatically (in real-time or at scheduled intervals) print all received applications and/or contracts. This provides the participating FI with paper copies of the required documentation for such purposes as fulfilling documentation requirements for securitization.

Screen Interface

As alluded to above, a dealer and/or a customer preferably use a touch-screen interface in order to enter and process a credit application. We now illustrate aspects of this interaction by examining its unfolding through five stages and referencing FIGS. 2–11.

Figure 2:
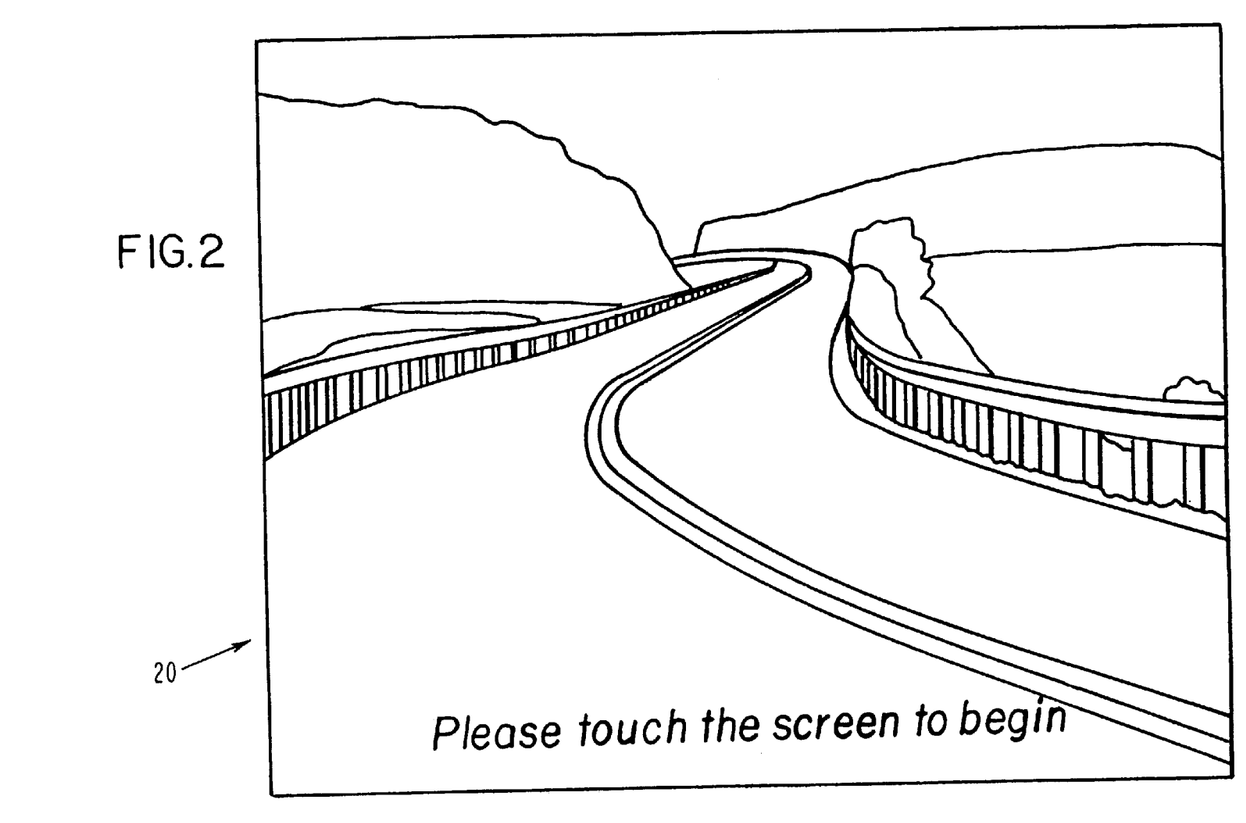
FIGS. 2–11 show various computer display screens which illustrate different aspects of the present invention.
Figure 3:
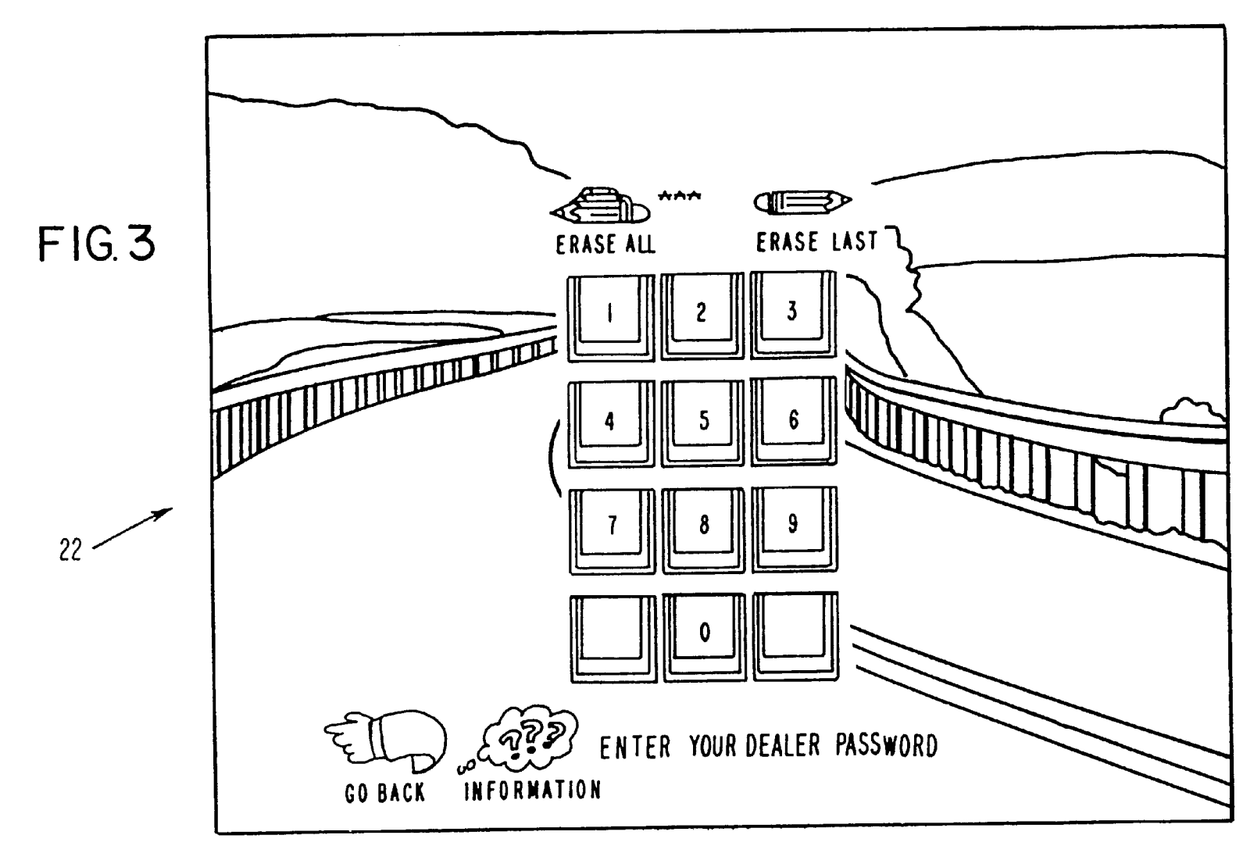
Figure 4:
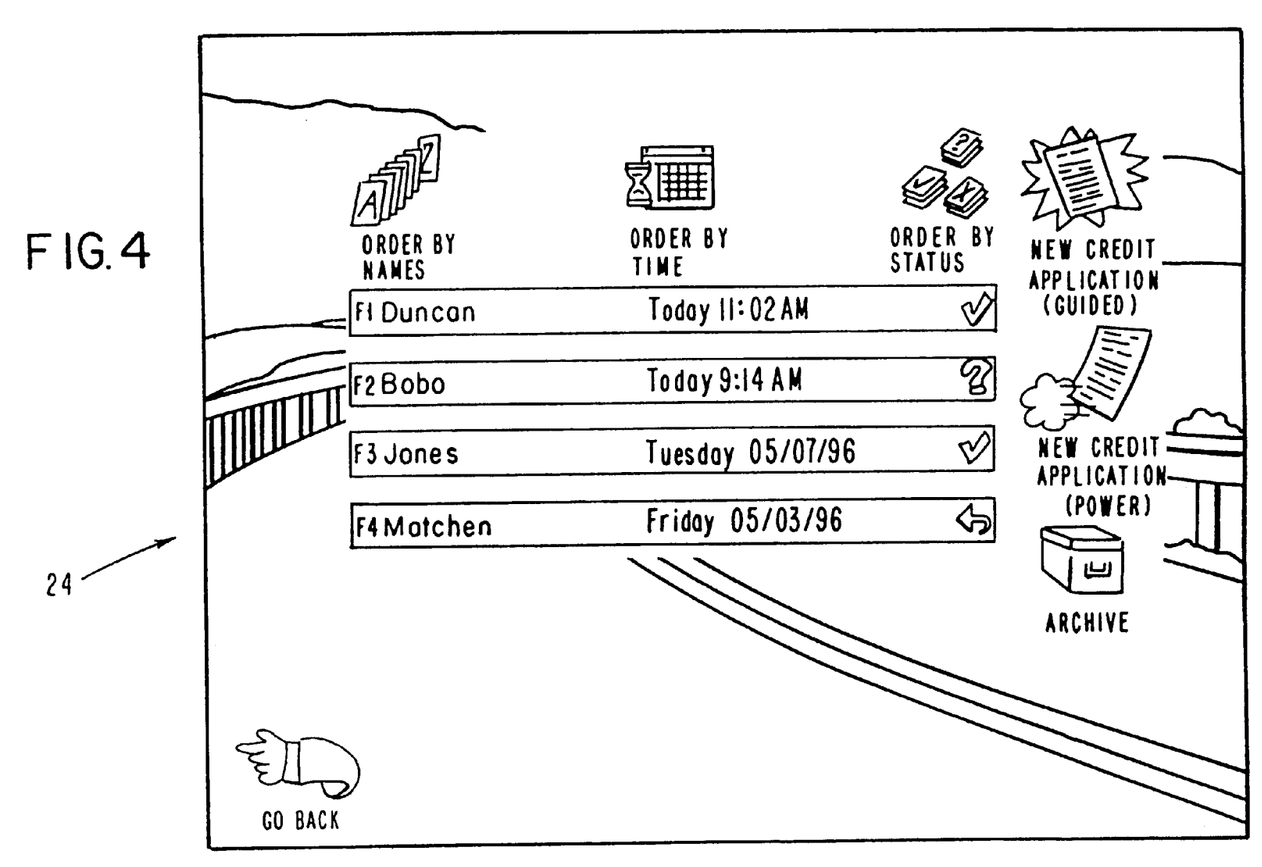

FIGS. 2–4 (numerals 20–24), in particular, are dedicated to an initial stage of signing on to an application. Thus, one may touch the FIG. 2 screen to begin, which in turn, sequentially accesses the (self-evident) FIG. 3 "dealer password" screen and then a FIG. 4 main menu screen. FIG. 4 displays status indicators that preferably change as the credit application moves through an approval process. One can sort the applications-in-progress by name, time, or status by touching the push bottoms at the top of the screen.

Figure 5:
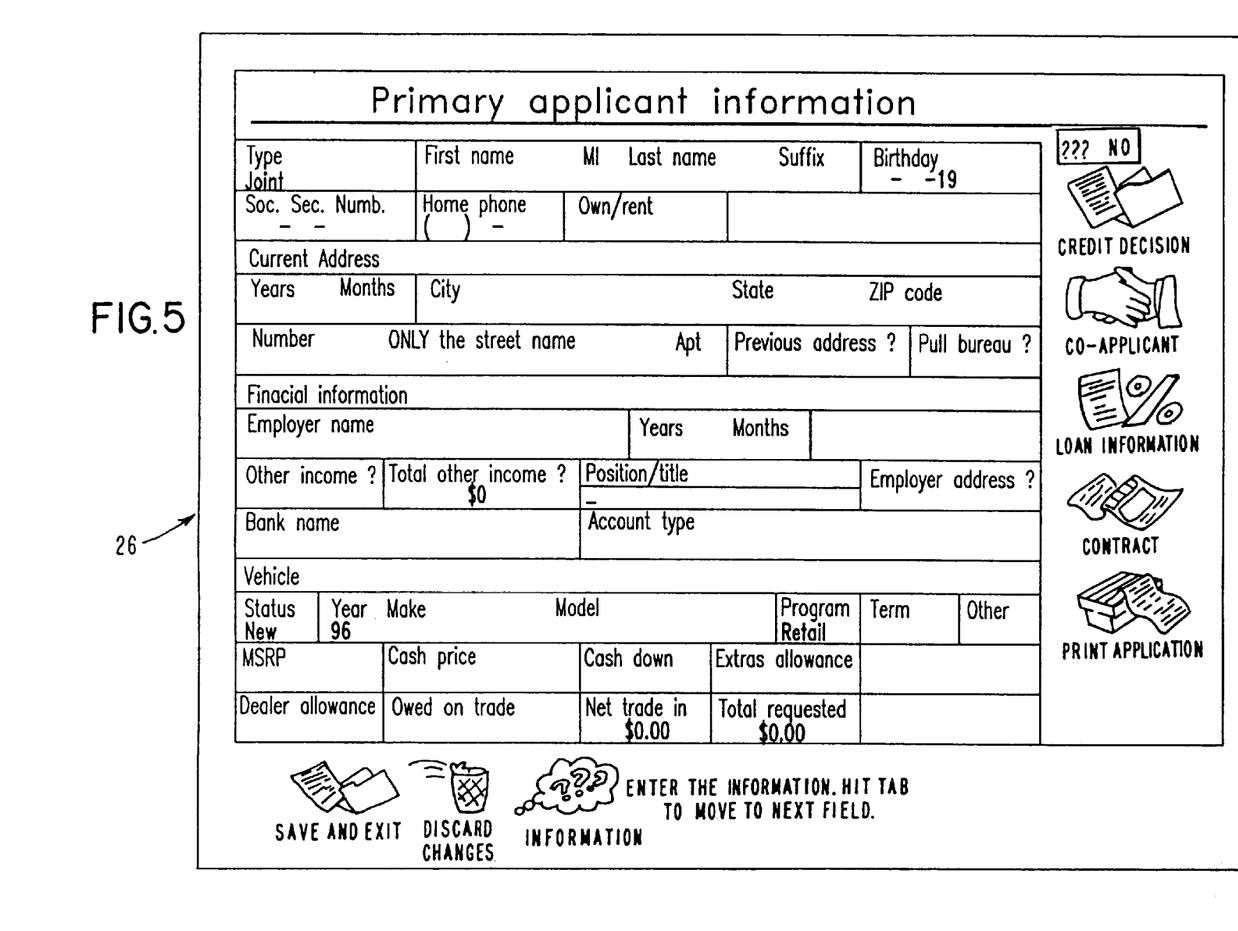
Figure 6:
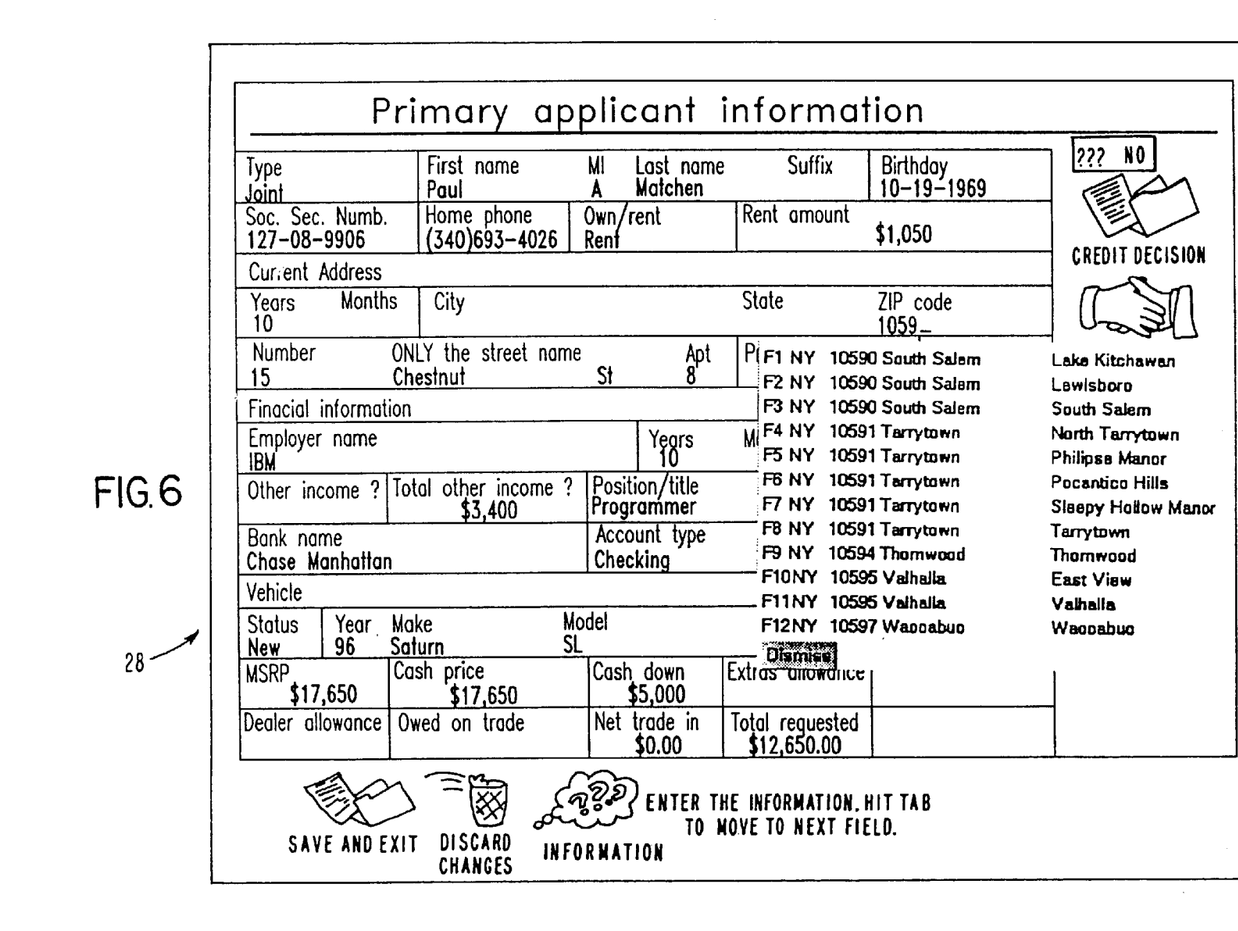

FIG. 5 (numeral 26) is dedicated to a second stage of entering the credit application and comprises a primary applicant information power screen. The powerscreen preferably is organized into several logical groupings: name, current address, financial information, and vehicle. Fields to be completed may be highlighted. FIG. 6 (numeral 28) shows an exemplary filled out primary applicant information powerscreen.

Figure 7:
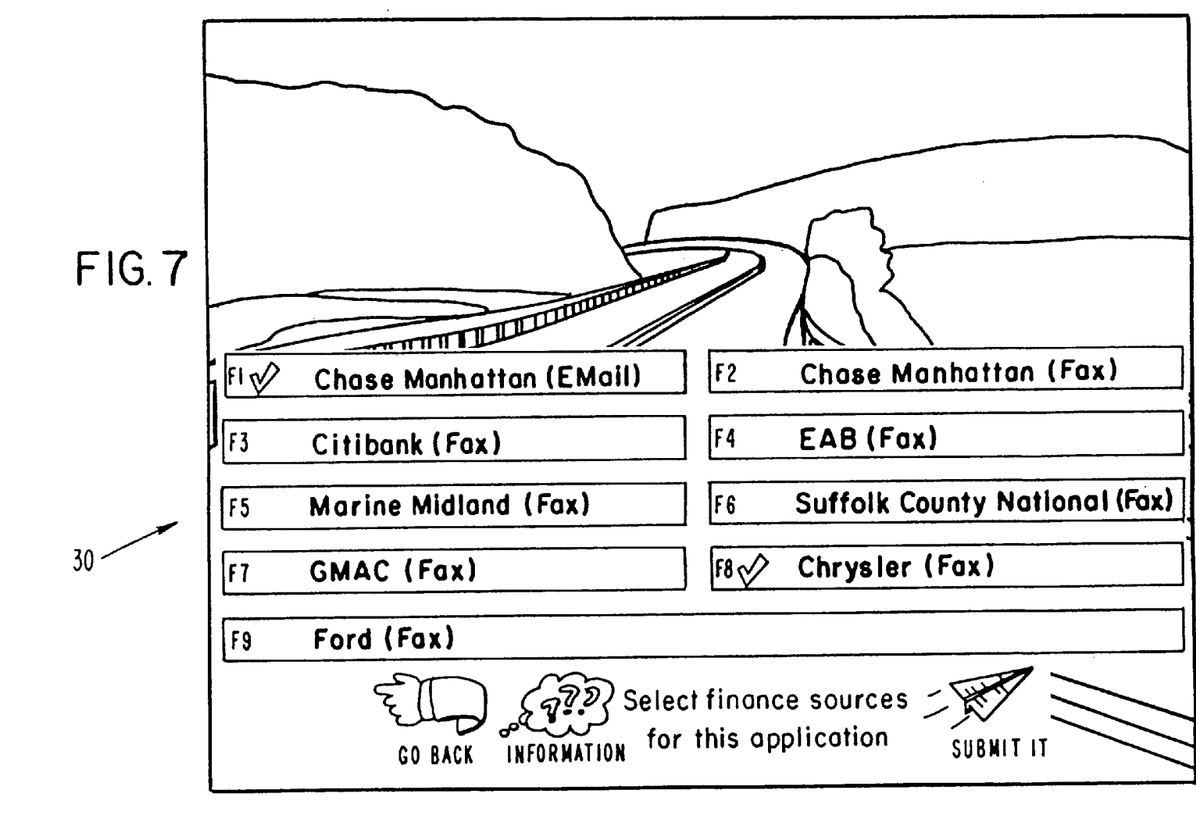
Figure 8:
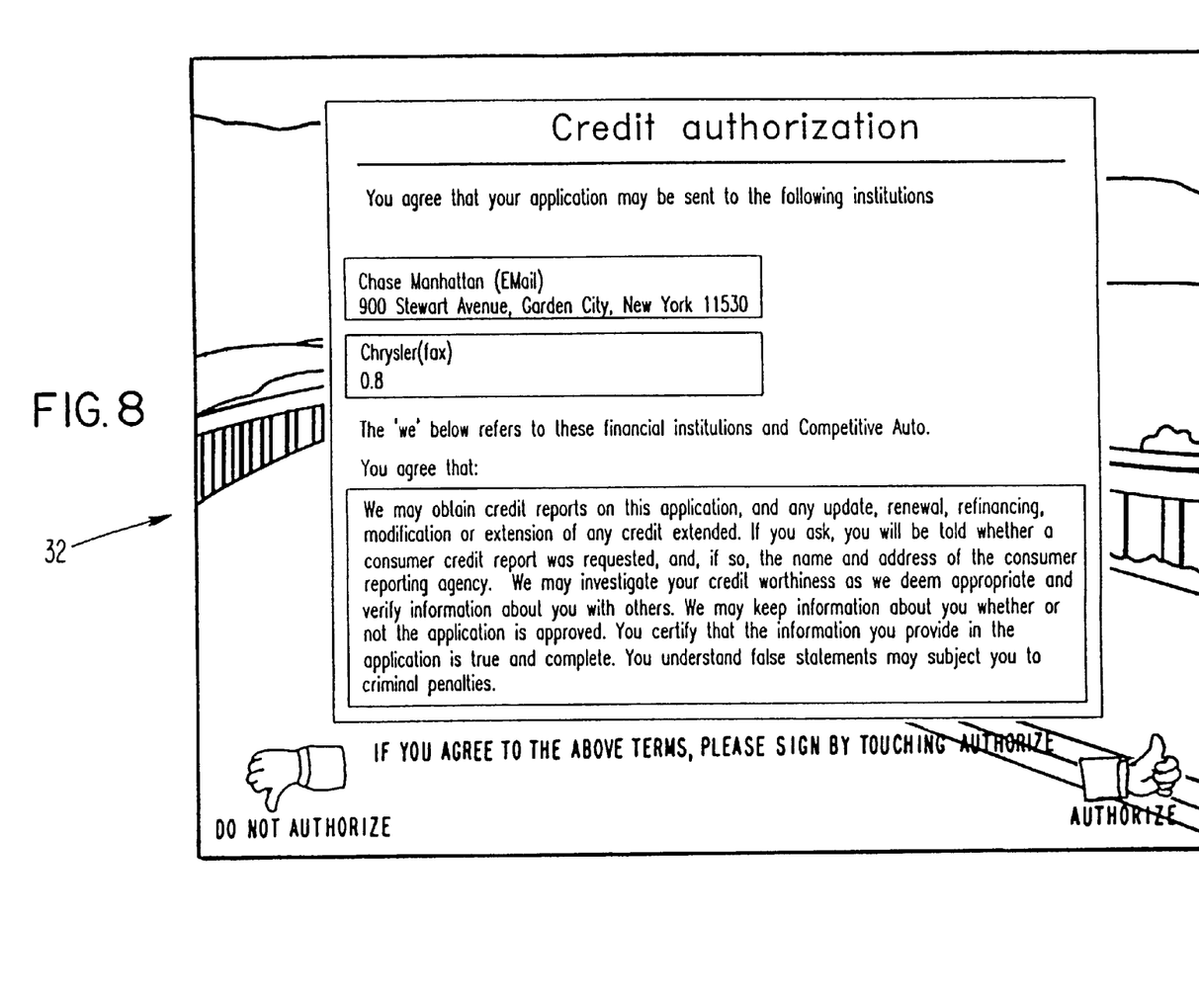
Figure 9:
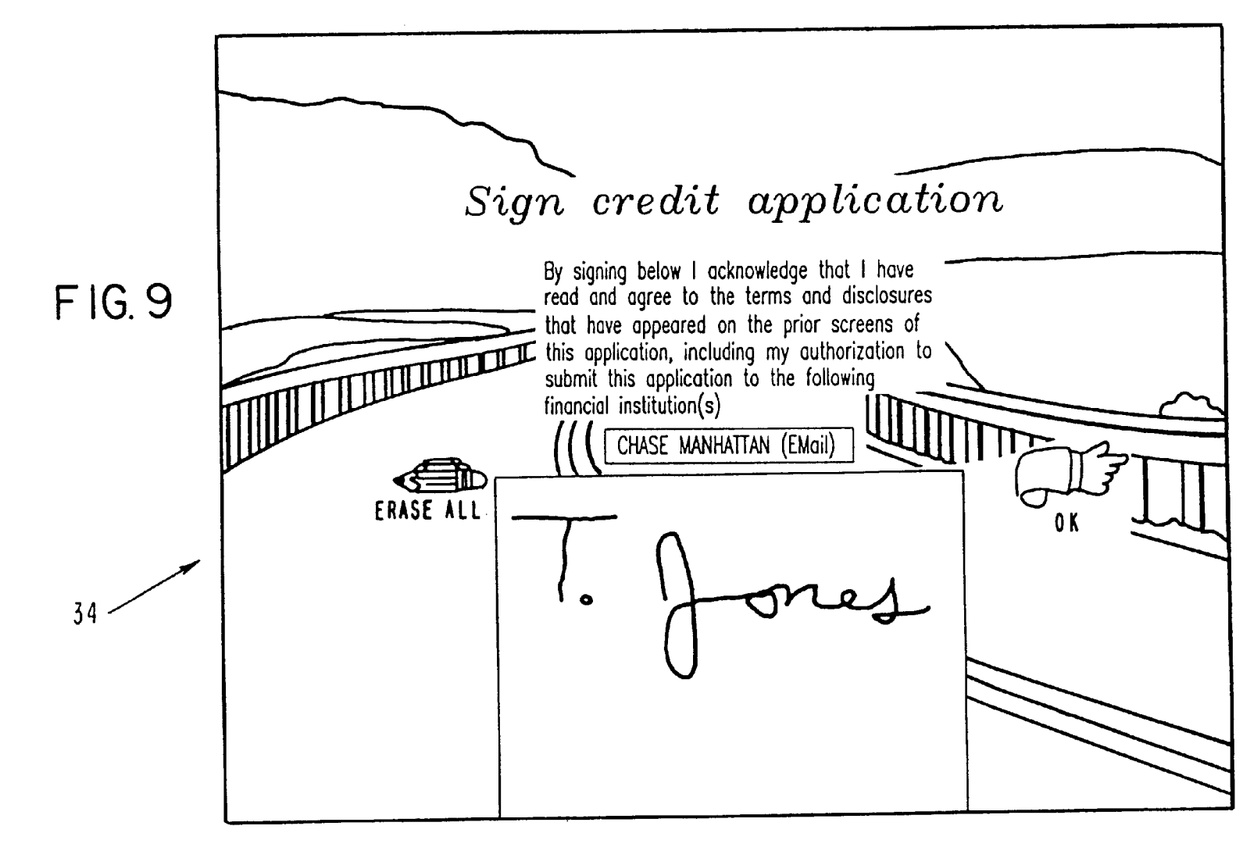

FIGS. 7–9 (numerals 30–34) are dedicated to a third stage of transmitting the credit application. This stage may be initiated by touching the FIG. 6 "ready to submit" push button. This action, in turn, can prompt the screens shown in FIGS. 7–9. In particular, FIG. 7 illustrates a financial sources menu, FIG. 8 illustrates a credit authorization screen, and FIG. 9 features a signature screen.

Figure 10:
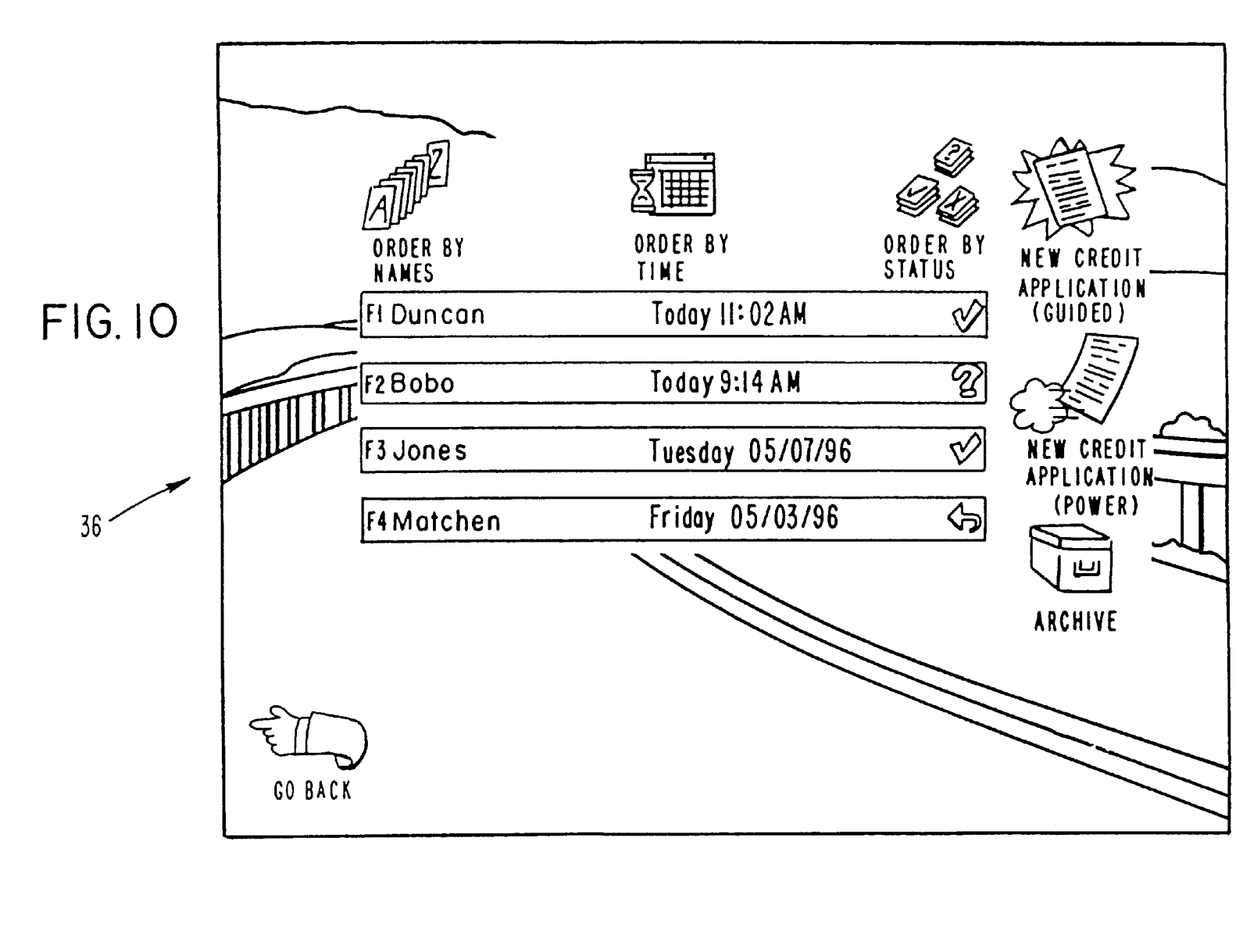

A fourth stage comprising viewing a credit decision is illustrated in FIG. 10, numeral 36. Here, if the status of the decision was approved, with stipulation, then a "Stipulations" field would contain the stipulation information. On the other hand, if the credit application were rejected, then a "Turn down" field would contain the reason.

Figure 11:
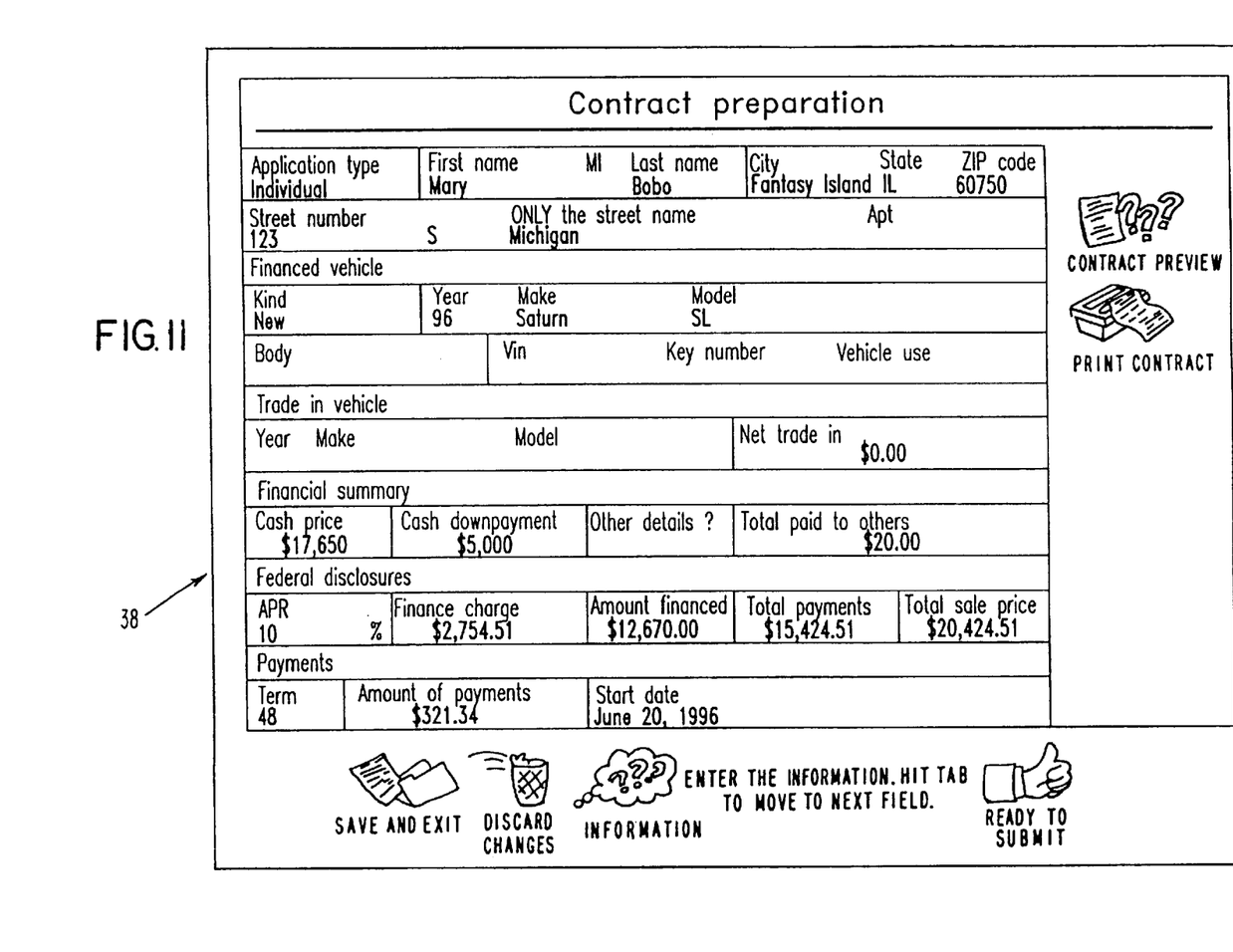

Finally, a fifth stage comprising contract preparation and printing, as illustrated in FIG. 11, numeral 38, may be initialized.

Note that other screens dedicated, for example to customizing, may be integrated with any of the aforementioned screens.

What is claimed is:

1. A system for electronically developing and processing a document, the system comprising:
  1) at least one local computer workstation, wherein at least one such a local workstation can electronically capture information input by a first party for originating and developing the document, said first party retaining control of said document until execution;
  2) at least one remote information bureau computer, wherein at least one such information bureau computer is connectable to said at least one local workstation for electronically further developing the document; and
  3) a plurality of remote entities selectively connectable by said first party to said at least one local computer workstation, at least one entity of said plurality of remote entities comprising a second party to the document and having at least one computer connectable to said at least one local computer workstation for electronically further developing the document for contemplated execution of the document by said first and second parties.

2. A system according to claim 1, wherein at least one of the local workstations comprises a display means for ascertaining a content of the document.

3. A system according to claim 1, wherein at least one of the local workstations comprises means for printing the document.

4. A system according to claim 1, wherein the input information comprises content information, and wherein said content information is verified as it is entered.

5. A system according to claim 1, wherein at least one of the local workstations comprises means for recognizing a qualitative extent of further developing the document and transmitting it to said at least one information bureau computer or said at least one entity based on the qualitative extent.

6. A system according to claim 1, wherein at least one of the local workstations comprises an interface device, said interface device comprising at least one of a mouse, a keyboard, a touch-screen, a signature pen, a trackball, and a tablet.

7. A system according to claim 6, wherein any one or more of the devices may be active simultaneously.

8. A system according to claim 1, wherein at least one of the local workstations comprises means for dynamically concurrently affecting the content of the document as said document is being used.

9. A system according to claim 1, further comprising a server operatively coupled to said at least one local computer workstation.

10. The system according to claim 9, wherein said server comprises means for acting as a store and forward node.

11. A system according to claim 1, wherein said at least one local workstation, said at least one information bureau computer, and said at least one entity are connected through the internet.

12. The system according to claim 1, wherein said plurality of entities include at least one of a plurality of financial institutions, a plurality of insurance institutions, a plurality of retail institutions, and a plurality of consumer institutions.

13. The system according to claim 1, wherein said information electronically captured comprises content information, and said content information is reusable by said system.

14. The system according to claim 1, wherein said information electronically captured comprises content information, and said content information is savable generically in an independent format and is reformattable for specific ones of said plurality of remote entities.

15. The system according to claim 14, wherein said content information is captured onto an electronic form.

16. The system according to claim 15, wherein said electronic form is dynamically and concurrently modifiable, as said electronic form is being used, to fit a characteristic of at least one of said first party, said second party and a transaction therebetween.

17. The system according to claim 14, further comprising:
means for reformatting said content information, said content information being reformattable for each of said plurality of remote entities.

18. The system according to claim 1, wherein said information electronically captured comprises content information, and said content information is reusable, and wherein said content information is savable generically in an independent format and is reformattable for specific ones of said plurlity of remote entities.

19. The system according to claim 1, wherein at least one of said at least one local computer workstation, said at least one of said information bureau computer and said at least one of said plurality of remote entities comprises means for acting as a store and forward node.

20. The system according to claim 1, wherein said information electronically captured comprises content information, said system further comprising:
means for reformatting said content information, said content information being reformattable for each of said plurality of remote entities.

21. The system according to claim 1, wherein said document comprises at least one of a legal document and a transactional document.

22. The system according to claim 1, wherein said information comprises content information, and said content information is captured onto an electronic form.

23. The system according to claim 22, wherein said electronic form is dynamically and concurrently modifiable, as said electronic form is being used, to fit a characteristic of at least one of said first party, said second party and a transaction therebetween.

24. The system according to claim 1, wherein said at least one local computer workstation controls interaction between said plurality of remote entities to shape completeness and quality of said document.

25. The system according to claim 1, wherein said at least one local computer workstation stores thereon said document being developed.

26. A system for electronically developing and processing a document, the system comprising:
1) at least one local computer workstation, wherein at least one such local workstation can electronically capture information input by a first party for originating and developing the document; and
2) a plurality of remote entities selectively connectable by said first party to said at least one local workstation, at least one entity of said plurality of remote entities comprising a second party to the document and having at least one computer connectable to said at least one local computer workstation for electronically further developing the document for contemplated execution of the document by said first and second parties, wherein said first party retains control of said document from origination until execution.

27. A system according to claim 26, wherein at least one of the local workstations comprises a display means for ascertaining a content of the document.

28. A system according to claim 26, wherein at least one of the local workstations comprises means for printing the document.

29. A system according to claim 26, wherein the input information comprises content information, and said content information is verified as it is entered.

30. A system according to claim 26, wherein at least one of the local workstations comprises means for recognizing a qualitative extent of further developing the document and transmitting it to an information bureau or said at least one entity based on the qualitative extent.

31. A system according to claim 26, wherein at least one of the local workstations comprises an interface device, said interface device comprising at least one of a mouse, a keyboard, a touch-screen, a signature pen, a trackball, and a tablet.

32. A system according to claim 31, wherein any one or more of the devices may be active simultaneously.

33. A system according to claim 26, wherein at least one of the local workstations comprises means for dynamically and concurrently affecting the content of the document as said document is being used.

34. A system according to claim 26, further comprising a server coupled to said at least one local computer workstation.

35. The system according to claim 34, wherein said server comprises means for acting as a store and forward node.

36. The system according to claim 26, wherein said plurality of entities include at least one of a plurality of financial institutions, a plurality of insurance institutions, a plurality of retail institutions, and a plurality of consumer institutions.

37. The system according to claim 26, wherein said information electronically captured comprises content information, and said content information is reusable.

38. The system according to claim 26, wherein said information electronically captured comprises content information, and said content information is savable generically in an independent format and is reformattable for specific ones of said plurality of remote entities.

39. The system according to claim 38, wherein said information electronically captured comprises content information, said system further comprising:
    means for reformatting said content information, said content information being reformattable for each of said plurality of remote entities.

40. The system according to claim 26, wherein said information electronically captured comprises content information, and said content information is reusable, and
    wherein said content information is savable generically in an independent format and is reformattable for specific ones of said plurality of remote entities.

41. The system according to claim 26, wherein at least one of said at least one local computer workstation and said at least one of said plurality of remote entities comprises means for acting as a store and forward node.

42. The system according to claim 26, wherein said information electronically captured comprises content information, said system further comprising:
    means for reformatting said content information, said content information being reformattable for each of said plurality of remote entities.

43. The system according to claim 26, wherein said document comprises at least one of a legal document and a transactional document.

44. The system according to claim 26, wherein said at least one local computer workstation controls interaction between said plurality of remote entities to shape completeness and quality of said document.

45. The system according to claim 26, wherein said at least one local computer workstation stores thereon said document being developed.

46. A method for electronically developing and processing a document, comprising:
    electronically capturing, by at least one local computer workstation, information input by a first party for originating and developing the document;
    selectively connecting said at least one local workstation to said at least one local workstation for electronically further developing the document; and
    selectively connecting said at least one local computer workstation to a plurality of remote entities, at least one entity of said plurality of remote entities comprising a second party to the document and having at least one computer connectable to said at least one local computer workstation for electronically further developing the document for contemplated execution of the document by said first and second parties, wherein said first party retains control of said document from origination until execution.

47. The method according to claim 46, further comprising:
    controlling, by said at least one local computer workstation, interaction between said plurality of remote entities to shape completeness and quality of said document.

48. The method according to claim 46, further comprising:
    storing, on said at least one local computer workstation, said document being developed.

* * * * *

UNITED STATES PATENT AND TRADEMARK OFFICE
CERTIFICATE OF CORRECTION

PATENT NO. : 6,603,487 B1  
APPLICATION NO. : 08/741459  
DATED : August 5, 2003  
INVENTOR(S) : William Edward Bennett et al.

It is certified that error appears in the above-identified patent and that said Letters Patent is hereby corrected as shown below:

In the Claims:

In Claim 46, column 12, lines 10-11, after "selectively connecting said at least one local workstation", please delete "to said at least one local workstation".

Signed and Sealed this
Ninth Day of July, 2013

Teresa Stanek Rea
*Acting Director of the United States Patent and Trademark Office*